(12) United States Patent
Stanford et al.

(10) Patent No.: US 7,343,846 B2
(45) Date of Patent: Mar. 18, 2008

(54) ACTUATOR HAVING EXTERNAL LOAD SUPPORTING MEMBER

(75) Inventors: Frantz D. Stanford, Madison, WI (US); Jesus Salvador Gonzalez Sanz, Guadarrama (ES); Bruce Edwin Knuth, Marshall, WI (US)

(73) Assignee: Actuant Corporation, Glendale, WI (US)

( * ) Notice: Subject to any disclaimer, the term of this patent is extended or adjusted under 35 U.S.C. 154(b) by 0 days.

(21) Appl. No.: 10/548,449

(22) PCT Filed: Mar. 9, 2004

(86) PCT No.: PCT/US2004/007107

§ 371 (c)(1),
(2), (4) Date: Aug. 3, 2006

(87) PCT Pub. No.: WO2004/081377

PCT Pub. Date: Sep. 23, 2004

(65) Prior Publication Data

US 2006/0260462 A1    Nov. 23, 2006

Related U.S. Application Data

(60) Provisional application No. 60/453,234, filed on Mar. 10, 2003.

(51) Int. Cl.
*F15B 15/26*    (2006.01)
*B66F 3/24*    (2006.01)
(52) U.S. Cl. .............................. 92/23; 92/18
(58) Field of Classification Search .................. 92/13, 92/15, 18, 20, 23
See application file for complete search history.

(56) References Cited

U.S. PATENT DOCUMENTS

| 1,435,128 | A |   | 11/1922 | Newman |
|---|---|---|---|---|
| 1,439,105 | A | * | 12/1922 | Hill .............................. 92/23 |
| 1,522,381 | A |   | 1/1925 | Murphy |

(Continued)

FOREIGN PATENT DOCUMENTS

DE    2255970 A1    5/1974

(Continued)

OTHER PUBLICATIONS

International Search Report, Form PCT/ISA/210, as issued by United States Patent and Trademark Office in Connection with PCT Application No. PCT/US04/07107.

(Continued)

*Primary Examiner*—Thomas E. Lazo
(74) *Attorney, Agent, or Firm*—Quarles & Brady LLP (57) ABSTRACT

A hydraulic actuator is provided for supporting a load. The actuator includes a cylinder, a lower end closed by a base, and an annular side wall connected between the base and the upper wall. A piston is disposed partially within the cylinder, and includes a rod extending through the upper end of the cylinder, and a piston head that defines a hydraulic chamber with the base. A cylinder chamber is disposed between the base and the piston head and communicates with a fluid source and a fluid return to correspondingly extend and retract the piston. A support member is connected to the cylinder wall, and can be raised to support a tilt saddle member between the piston rod and the load after the piston has been extended.

14 Claims, 6 Drawing Sheets

U.S. PATENT DOCUMENTS

| | | | | |
|---|---|---|---|---|
| 2,258,825 A | | 10/1941 | Thompson | 121/40 |
| 2,455,439 A | * | 12/1948 | Page | 92/15 |
| 3,047,269 A | | 7/1962 | Renshaw | 254/93 |
| 3,135,555 A | * | 6/1964 | Mecaskey | 92/23 |
| 4,890,703 A | | 1/1990 | Hathaway | 188/300 |
| 6,145,812 A | | 11/2000 | Ivanova | |

FOREIGN PATENT DOCUMENTS

| | | | |
|---|---|---|---|
| DE | 3245186 A1 | | 7/1984 |
| DE | 8633001 U1 | | 12/1987 |
| JP | 2000136094 A | | 5/2000 |
| JP | 2000136094 A | * | 5/2000 |

OTHER PUBLICATIONS

Written Opinion of the International Searching Authority under date of Jan. 25, 2005 as issued in connection with PCT Application No. PCT/US04/07107.

Supplementary European Search Report; PCT/US2004007107; Nov. 7, 2007.

* cited by examiner

Prior Art

Fig. 1A

Prior Art

ACTUATOR HAVING EXTERNAL LOAD SUPPORTING MEMBER

CROSS-REFERENCE TO RELATED APPLICATIONS

This application claims priority to U.S. Provisional Application Ser. No. 60/453,234 filed Mar. 10, 2003, the disclosure of which is hereby incorporated by reference as if set forth in its entirety herein.

BACKGROUND OF THE INVENTION

The present invention relates generally to mechanical lift systems and, in particular, relates to a method and apparatus for fixing the position of a hydraulic cylinder in an extended position while avoiding the need to maintain high hydraulic pressure.

Figure 1A:
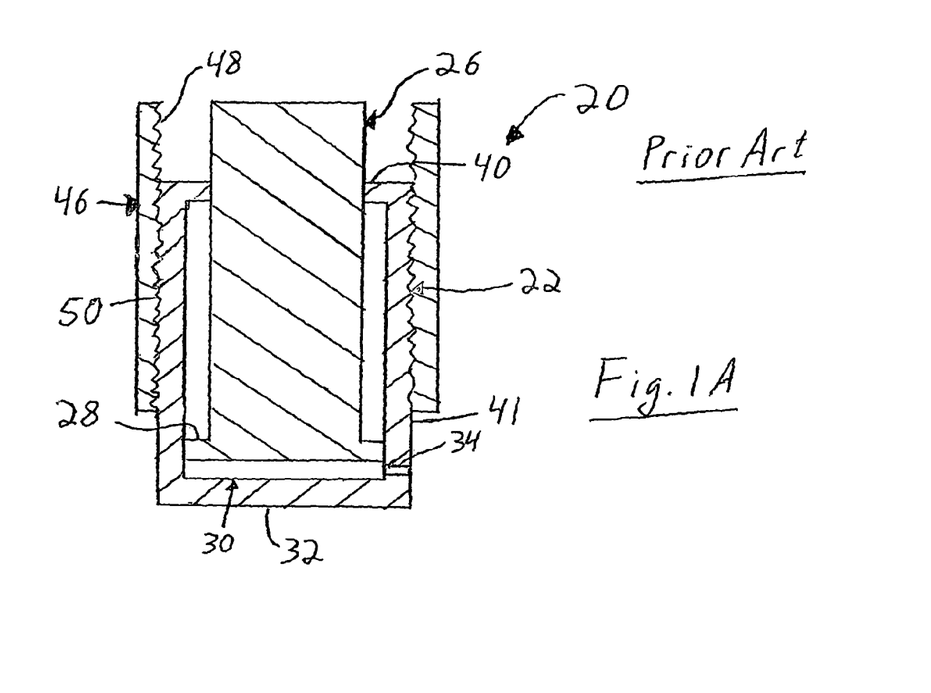
FIG. 1A is a sectional side elevation view of a single-acting hydraulic actuator constructed in accordance with prior art techniques.

Referring to FIG. 1A, conventional lifting systems include one or more hydraulic actuators 20, each having a cylinder 22 that includes an annular side wall 41 closed at its lower end by a base 32, and closed at its upper end by an upper wall 40. Cylinder 22 houses a movable piston 26 that extends through an aperture 43 formed in upper wall 40. Piston 26 includes a piston head 28 that slides and seals against the inner surface of the annular wall 41 to define a hydraulic chamber 30 disposed between the base 32 of cylinder 22 and the piston head 28.

In single-acting actuators, high pressure fluid is delivered to chamber 30 via a port 34 that is connected to a fluid source (not shown). The pressure acts on the undersurface of the piston head 28 to bias the piston 26 and supported load (not shown) upwardly. Hydraulic fluid may be returned from the chamber 30 to a tank (not shown) via orifice 34 when it is desirable to retract the piston 26.

As the piston 26 is maintained in an extended position over time, hydraulic pressure delivered by the pressure source tends to wane, or fluid tends to leak, and the weight of the load begins to force the piston 26 from its extended position. It has thus become desirable to provide an external member that supports piston 26 once the piston 26 has reached its desired extension, thereby reducing or eliminating the need to deliver continued hydraulic pressure to the cylinder chamber 30.

Conventional systems therefore employ an annular locknut 46 having inner threads 48 that mate with outer threads 50 of cylinder 22. Threads 48 and 50 have a pitch such that rotation of locknut 46 translates the locknut up and down along piston 26. Accordingly, when the piston 26 is extended, the locknut 46 can be raised to a position whereby the upper surface of the locknut directly engages the lower surface of the load. The piston 26 may then be lowered with the load supported entirely by locknut 46. However, if small angular misalignments exist between the load and the upper surface of the locknut 46, the weight of the load will not be equally distributed along the entire upper surface of the locknut. Rather, a large amount of weight will be supported at a small portion of the locknut, for example an edge, thereby subjecting the undersurface of the load along with the edge of the locknut 46 to potential damage associated with the high forces.

Figure 1B:
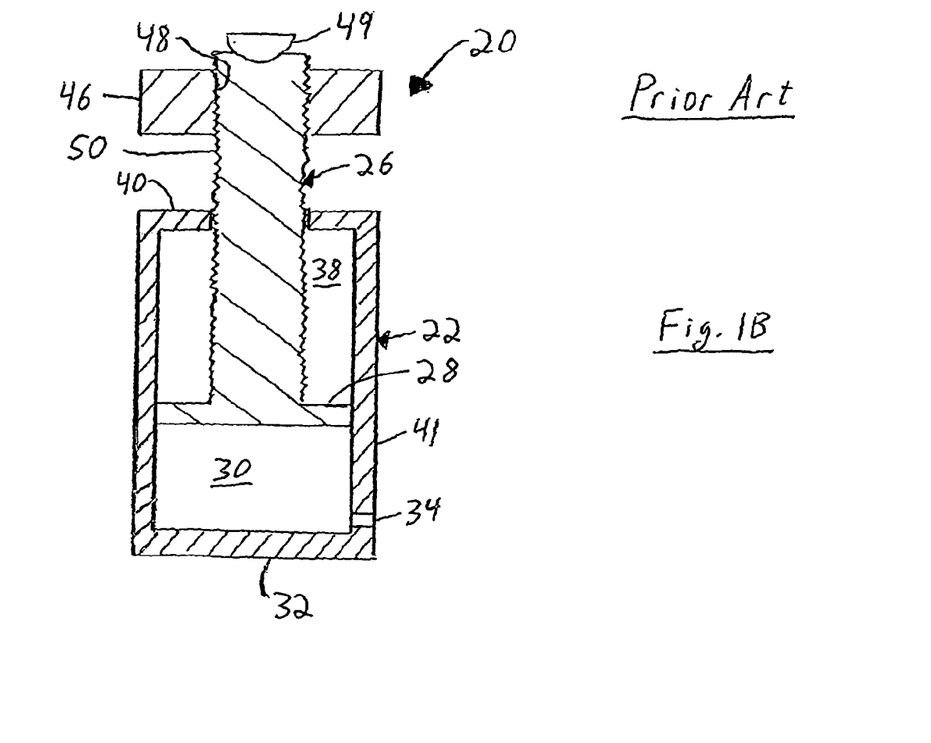
FIG. 1B is a sectional side elevation view of a single-acting hydraulic actuator constructed in accordance with prior art techniques.

Accordingly, referring now to FIG. 1B, conventional actuators 20 may employ a tilt saddle 49 having a domed lower surface that engages a ball-and-socket joint formed in the upper surface of piston 26. Actuator 20 further includes a locknut 46 defining a threaded cylindrical bore that mates with corresponding threads on the outer surface of piston 26 at a location between upper wall 40 and tilt saddle 49. Accordingly, locknut 46 may be raised and lowered by rotating the locknut with respect to the piston 26.

During operation, when the piston 26 is extended, the locknut 46 can be lowered against the upper wall 40 of the cylinder 22 to create an interference that prevents the piston 26 from being retracted even when the hydraulic fluid is returned from chamber 30 to tank. The locknut 46 is screwed upwardly along the piston 26 when the piston 26 is to be retracted. Once piston 26 is extended to engage the undersurface of a load, tilt saddle 49 wobbles to compensate for small angle misalignments between the load and the base 32 or foundation on which the actuator 20 is supported.

The tilt saddle/locknut combination has been suitable for use with actuators having single-acting cylinders, but not for double-acting cylinders, as the threaded piston rod prevents making a seal at the gland where it exits the cylinder. Double-acting cylinders are useful to permit power retraction of the piston.

BRIEF SUMMARY OF THE INVENTION

In accordance with one aspect of the invention, an actuator is provided supporting a load. The actuator includes a cylinder having an annular wall that defines an upper end and a lower end closed by a base. A piston is provided including a piston head and piston rod extending upwardly from the piston head through an opening formed in the upper wall. A cylinder chamber is disposed between the base and the piston head, and is placed in selective communication with a fluid source and a fluid return to correspondingly extend and retract the piston. A tilt saddle member is supported by the upper end of the piston. The tilt saddle member has an upper surface that supports the load. The tilt saddle member has a tilt saddle that wobbles relative to the piston in response to angular misalignments with the load. A support member is connected to the cylinder that can be raised relative to the cylinder to contact and support the tilt saddle member when the piston is extended.

These and other aspects of the invention are not intended to define the scope of the invention, for which purpose claims are provided. In the following description, reference is made to the accompanying drawings, which form a part hereof, and in which there is shown by way of illustration, and not limitation, a preferred embodiment of the invention. Such embodiment also does not define the scope of the invention, and reference must therefore be made to the claims for this purpose.

BRIEF DESCRIPTION OF THE DRAWINGS

Reference is hereby made to the drawings in which like reference numerals correspond to like elements throughout, and in which.

DETAILED DESCRIPTION OF THE PREFERRED EMBODIMENT

Figure 2A:
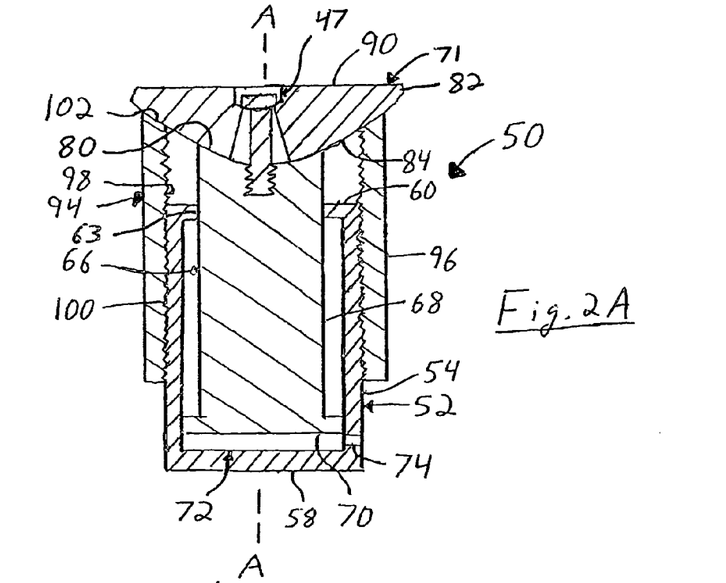
FIG. 2A is a sectional side elevation view of a single-acting hydraulic actuator having a support nut constructed in accordance with a preferred embodiment of the invention, wherein the cylinder is in a retracted position.

Referring to FIG. 2A, a linear hydraulic actuator 50 includes a cylinder 52 extending vertically along the direction of central Axis A-A. Unless otherwise noted, the actuator can be formed from any suitable metal as appreciated by one having ordinary skill in the art. Cylinder 52 includes an annular side wall 54 that is closed at its lower end by a base 58, and closed at its upper end by an upper end wall 60. A cylindrical opening 63 extends through upper end wall 60.

It should be appreciated that the terms "vertical" and "horizontal" are used throughout this disclosure with reference to the illustrated orientation of actuator 50. However, the actuator 50 of the present invention is not to be limited to the illustrated orientation, and could assume any orientation to support a given load suitable for use with a support member of the present invention. Therefore, unless otherwise specified, the term "vertical" is used synonymously with "axial" and "horizontal" is used synonymously with the term "radial" for the purposes of this disclosure.

A piston 66 defines a cylindrical rod 68 that is elongated along axis A-A. Rod 68 has a height greater than side wall 54, and defines a diameter substantially equal to the diameter of opening 63 such that rod 68 forms a tight sliding fit through opening 63. The minimal clearance of rod 68 with respect to opening 63 enables adequate guidance of the piston 66 during operation. Alternatively, or additionally, a gland seal or the like (not shown) can be provided at the interface between rod 68 and upper end wall 60 as is well-known in the art to provide a seal if, for instance, cylinder 52 is a double-acting cylinder.

Rod 68 is integrally connected at its lower end to a piston head 70 defining an outer diameter that is substantially equal to the inner diameter of annular side wall 54. A hydraulic chamber 72 is therefore defined axially between the base 58 of cylinder 52 and the piston head 70, and is defined radially by the inner surface of annular wall 54. The interface between the periphery of piston head 70 and side wall 54 is sealed to ensure that no hydraulic fluid leaks from the chamber 72. An inlet/outlet port 74 extends radially through the lower end 56 of cylinder wall 54 and is connected to a valve that can selectively connects chamber 72 it to a pressurized hydraulic fluid supply and tank (not shown) in the usual manner.

Figure 2B:
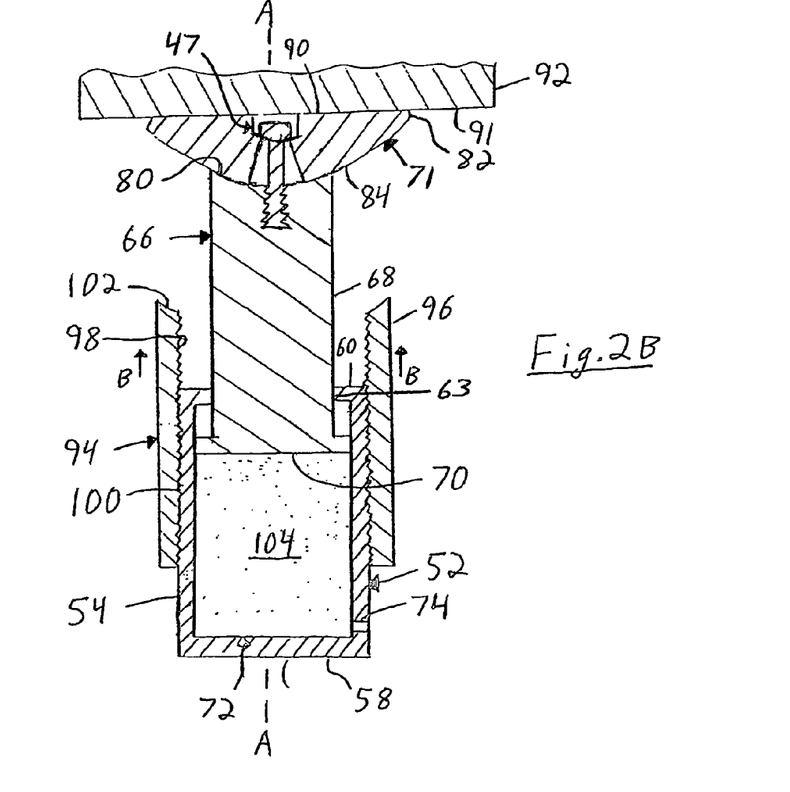
FIG. 2B is a sectional side elevation view of the hydraulic actuator illustrated in FIG. 2A, wherein the cylinder is in an extended position and the support nut is in a disengaged position.

During operation, pressurized hydraulic fluid is delivered from the supply to chamber 72 via port 74 when piston 66 is to be extended to support a load 92, as illustrated in FIG. 2B. Hydraulic fluid is returned from chamber 72 to the tank via port 74 when piston 66 is to be retracted. Alternatively, it should be appreciated that the supply and tank can be permanently operatively coupled to chamber 72 via a pair of dedicated ports. It should further be appreciated that actuator 50 can operate under pneumatic pressure instead of hydraulic pressure. Because movement of piston 66 is controlled using a single chamber 72, actuator 50 is said to be a "single-acting" actuator.

Figure 3:
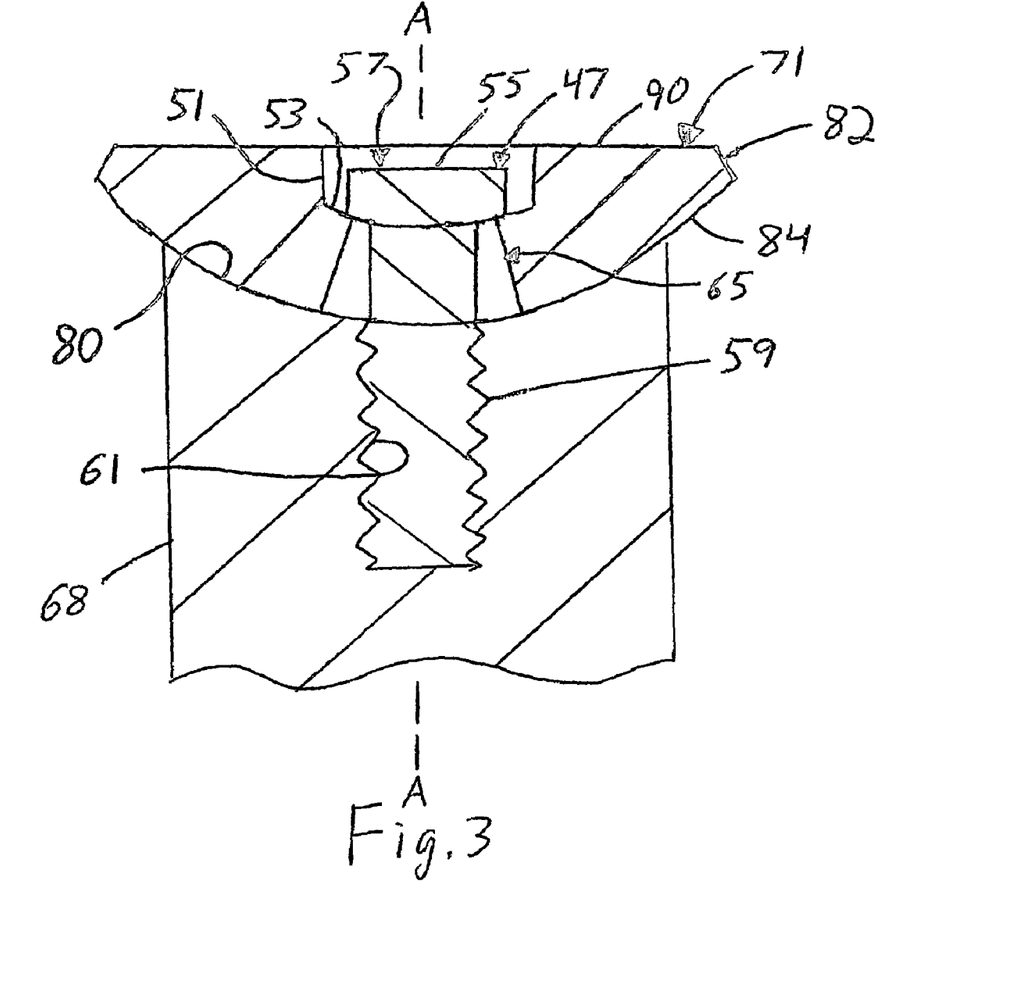
FIG. 3 is an enlarged sectional side elevation view of the tilt saddle illustrated in FIGS. 2A-2C.

Referring also to FIG. 3, actuator 50 further includes a tilt saddle member 71 having a tilt saddle 82 that automatically compensates for small angular misalignments between the load 92 and base 58, upper wall 60, or foundation on which actuator 50 is supported. Tilt saddle 82 is disc-shaped and defines a substantially flat upper surface 90 integrally connected to a domed lower surface 84. Upper surface 90 supports the undersurface of load 92 during operation, and lower surface 84 interfaces with a socket 80 formed in the upper surface of rod 68. In particular, socket 80 is inwardly domed in the upper surface of rod 68, and defines a contour that mates with the contour of lower surface 84. Upper surface 90 extends horizontally when base 84 is centrally disposed within socket 80.

Tilt saddle 82 is mounted in socket 80 via a mounting assembly 47. In particular, referring to FIG. 3, a countersink 51 is formed in upper surface 90, and defines a domed base 53 that extends parallel to surfaces 80 and 84. Base 53 provides a seat for the head 55 of a screw 57. Head 55 defines a diameter less than that of countersink 51, and defines a lower surface that is domed to mate with the contour of base 53. A threaded shank 59 extends downwardly from head 55 and mates with a threaded bore 61 extending down into rod 68. An frustoconical void 65 extends downwardly and radially outwardly from base 53 at a location inwardly from the outer edges of screw head 55. Void 65 could alternatively comprise any shape, such as a cylinder, so long as it provides sufficient clearance that enables tilt saddle 82 to wobble with respect to rod 68. Additionally, a washer (not shown) can be disposed between screw head 55 and base 53 that provides additional support for screw 57. The enhanced support would enable void 65 to define a larger radius at a location immediately below screw head 55.

Referring again to FIG. 2A, actuator 50 further includes a support nut 94 that can engage the lower surface of the saddle 82 to support the load and reduce wear on the remaining actuator components. Support nut 94 defines a vertical annular wall 96 that has an inner diameter approximately equal to the outer diameter of annular wall 54. The inner surface 98 of wall 96 is threaded and mates with threads 100 disposed on the radially outer surface of side wall 54 of the actuator cylinder 52. Threads 100 have a pitch such that rotation of the support nut 94 with respect to cylinder 52 translates the support nut 94 vertically up or down as desired during operation. Annular wall 96 has an upper surface 102 that defines a radius of curvature approximately equal to the radius of curvature of base 84. Accordingly, upper surface 102 of support nut 94 is configured to engage and support the base 84 of tilt saddle 82 when supporting load 92, regardless of the angular orientation of the tilt saddle.

As illustrated in FIG. 2A, when actuator 50 is in a retracted position, both the bottom of piston head 70 and the bottom of annular wall 96 are disposed slightly above port 74 and thus do not interfere with hydraulic fluid flow during operation of actuator 50.

Referring now to FIG. 2B, when it is desired to raise a load 92, actuator 50 is positioned beneath load 92 such that the upper surface 90 is axially aligned with the undersurface 91 of the load 92. Load 92 may include a house, other building, bridge, or other structures. It should be appreciated that actuator 50 as illustrated is a simplified set up which is provided for illustrative purposes.

Once actuator 50 is properly positioned, pressurized hydraulic fluid 104 is introduced into chamber 72 via port 74 to provide a force that raises piston head 70 until the upper wall 90 of tilt saddle 82 engages the undersurface 91 of load 92. Further introduction of hydraulic fluid into chamber 72 continues to force piston 66 upwards to lift load 92 to a desired height. Actuator 50 has a permissible degree of extension (stroke) equal to the vertical distance between port 74 and upper wall 60. For loads 92 whose undersurface 91 is uneven, or not horizontal, the undersurface 91 will engage upper surface 90 of tilt saddle 82. The undersurface 91 will bias the upper surface 90 to a position that provides the greatest amount of support for load 92. Tilt saddle 82 wobbles along the domed upper surface 80 of piston rod 68 to adjust the orientation of upper surface 90. In most instances, more than one actuator 50 of the type illustrated will be used to fully support load 92.

Figure 2C:
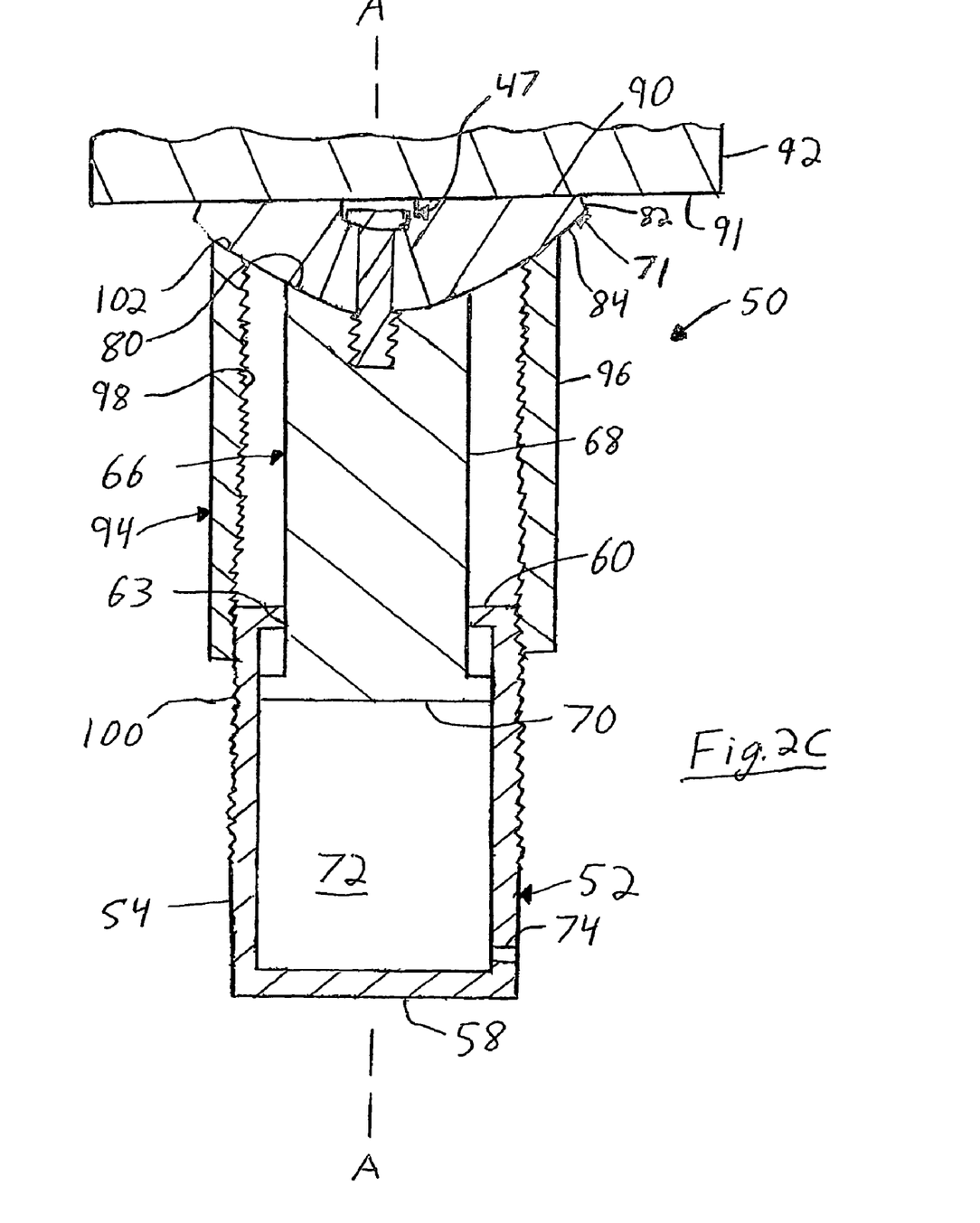
FIG. 2C is a sectional side elevation view of the hydraulic actuator similar to FIG. 2B, but with the support nut in an engaged position.

Referring now to FIG. 2C, it is often desirable to maintain the load 92 at its desired height for extended periods of time. Annular wall 96 may thus be rotated clockwise about side wall 54 to raise support nut 94 relative to tilt saddle 82 and load 92. Support nut 94 is raised until upper surface 102 supportively engages the base 84 of the tilt saddle 82. Advantageously, because support nut 94 is capable of fully supporting the load 92, hydraulic fluid 104 may be returned to the tank through port 74. Accordingly, the supply pump and valve may be turned off, thereby conserving energy and reducing wear on the components of the pump. Alternatively, it may be desirable to maintain some amount of pressurized hydraulic fluid in chamber 72 to reduce the stress experienced by support nut 94.

When it is desired to remove the support for load 92, hydraulic fluid 102 is reintroduced into chamber 72 as necessary to independently provide adequate support for the load 92. Next, annular wall 96 is rotated counterclockwise about side wall 54 to lower support nut 94 until the support nut is in its fully retracted position as illustrated in FIG. 2B or at least retracted enough so that it will not interfere with lowering the load 92. The hydraulic fluid 102 is then returned gradually to the tank via port 74 until the piston 66 is fully retracted.

Figure 4:
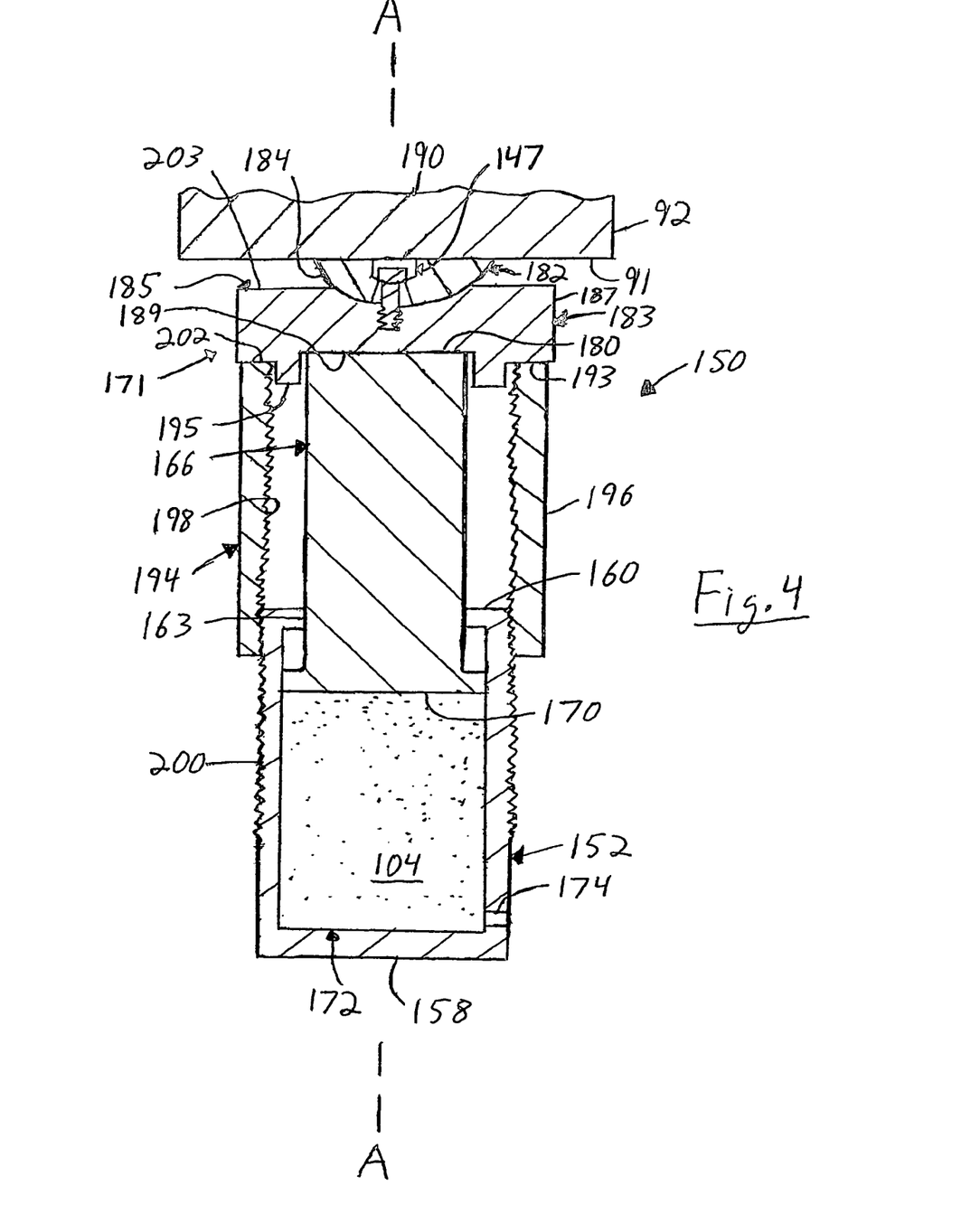
FIG. 4 is a sectional side elevation view of a hydraulic actuator constructed in accordance with an alternate embodiment of the invention.

Referring now to FIG. 4, an actuator 150 is illustrated in accordance with an alternate embodiment. It should be appreciated that the elements of FIG. 4 are identified by reference numerals corresponding to elements similar to the embodiment illustrated in FIGS. 2A-C incremented by 100 for the purposes of clarity and convenience.

In the embodiment of FIG. 4, the tilt saddle member 171 includes tilt saddle 182, as described above, and further includes a tilt saddle plate 183 that is seated on the upper surface 180 of piston 166. Saddle plate 183 is formed from a generally cylindrical body 187 having a downwardly extending annular flange 195, separating an outer lower surface 193 disposed radially outwardly from a middle lower surface 189. Flange 195 has an inner diameter slightly greater than the diameter of piston 166 such that middle portion 189 provides a seat for the upper surface 180 of piston 166, which is flat and extends radially (horizontally) in this embodiment. Outer surface 193 has a radial thickness slightly greater than that of annular wall 196. Accordingly, outer surface 193 engages upper surface 102 of annular wall 196, which is also flat and horizontally extending in accordance with this embodiment. Flange 195 thus extends downwardly between annular wall 196 and piston 166.

Tilt saddle 182 is supported in a domed upper surface 185 of saddle plate 183 via mounting assembly 147, which is constructed as illustrated in FIG. 3. During operation, Saddle plate 183 permits limited movement of the saddle 182, for example sliding at the spherical interface, so that saddle 182 can adapt to small angle misalignments between the load 92 and the base or foundation on which the actuator 150 is supported. During operation, once the piston 166 has reached its desired extension, annular wall 96 is rotated clockwise to raise support nut 194 to a position whereby the upper surface 202 of wall 196 engages the outer surface 193 of saddle plate 183. Hydraulic fluid 204 may then be removed from chamber 172 as desired. When load 92 is to be lowered, pressurized hydraulic fluid 204 is supplied to chamber 172, and support nut 194 is lowered to its retracted position. Hydraulic fluid 204 is then gradually removed from chamber 172 to lower the piston 166 and corresponding load 92.

The present invention thus provides a support nut that supports a tilt saddle directly, as illustrated in FIG. 2C, or alternatively may support the tilt saddle indirectly via a saddle plate as illustrated in FIG. 4.

Figure 5:
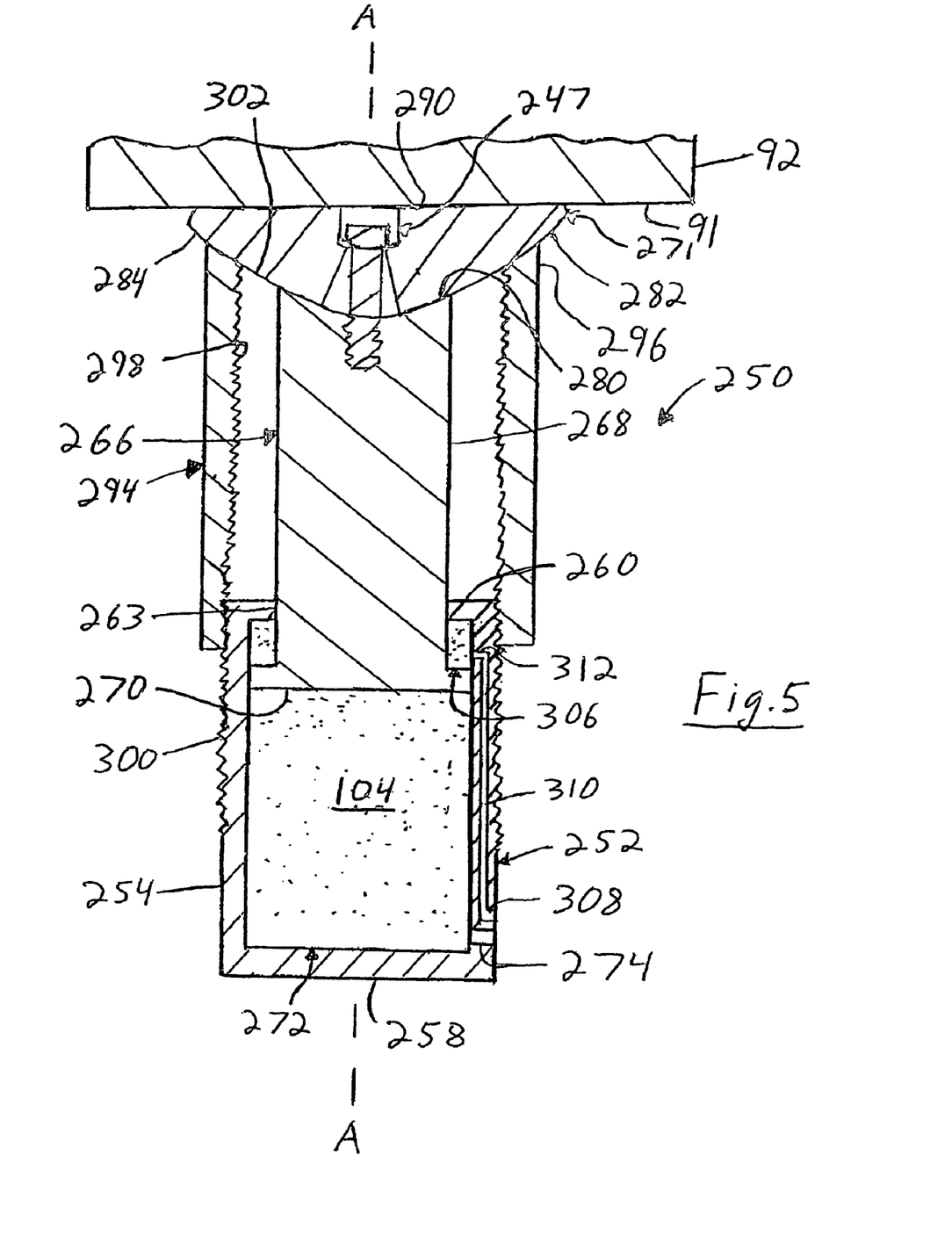
FIG. 5 is a sectional side elevation view of a double-acting hydraulic actuator constructed in accordance with another alternate embodiment of the invention.

Referring now to FIG. 5, the present invention recognizes that the tilt saddle can be implemented in combination with an actuator 250 having a double-acting cylinder 252. It should be appreciated that the elements of FIG. 5 are identified by reference numerals corresponding to elements similar to the embodiment illustrated in FIG. 4 incremented by 100 for the purposes of clarity and convenience.

Actuator 250 includes an upper hydraulic fluid chamber 306 disposed between piston head 270 and the undersurface of upper wall 260. A second port 308 extends partially into annular wall 254, and is connected to an internal channel 310 that extends vertically within wall 254. Channel 310 terminates at an orifice 312 that extends radially into chamber 306. Port 308 may be connected through suitable valving to the same or a different supply of hydraulic fluid as port 274. It should be appreciated that FIG. 6 illustrates only one of several possible configurations of a double-acting cylinder, and that the present invention is not intended to be limited to the embodiment shown. Rather, the scope of the present invention is intended to include any double-acting cylinder having a support nut constructed in accordance with the principles of the present invention.

During operation, hydraulic fluid 304 is selectively introduced into, and permitted to flow from, chambers 272 and 306 to extend and retract piston 266 as desired, as is well known in the art. The interface between rod 268 and opening 263 is sealed as well known in the art to prevent leakage of hydraulic fluid from the upper chamber 306. Advantageously, because support nut 294 is threadedly connected to cylinder wall 254 as opposed to piston 266, the radial periphery of rod 268 is smooth as opposed to threaded. As a result, a fluid-tight seal between rod 268 and opening 263 is easily achieved using conventional techniques.

In the embodiment illustrated in FIG. 5, tilt saddle 282 directly supports load 92 in the manner illustrated and described with reference to FIG. 2C. It should be appreciated, however, that double-acting cylinder 252 can be constructed in accordance with any of the embodiments illustrated and described herein along with the alternatives to those embodiments described herein. Accordingly, support nut 294 could support tilt saddle 282 indirectly via a support plate of the type described above with reference to FIG. 4. It should thus be appreciated that a support nut constructed in accordance with the present invention is intended to be broadly construed as a support member supported by cylinder wall 54 of a single or double-acting cylinder that may be selectively raised and lowered to support a given load.

The invention has been described in connection with what are presently considered to be the most practical and preferred embodiments. However, the present invention has been presented by way of illustration and is not intended to be limited to the disclosed embodiments. Accordingly, those skilled in the art will realize that the invention is intended to encompass all modifications and alternative arrangements included within the spirit and scope of the invention, as set forth by the appended claims.

We claim:

1. An actuator for supporting a load, the actuator comprising:
   a cylinder including an annular wall defining an upper end and a lower end closed by a base;
   a piston including a piston head and piston rod extending upwardly from the piston head through the upper end of the cylinder, wherein the piston rod defines an upper end;
   a cylinder chamber disposed between the base and the piston head that is placed in selective communication with a fluid source and a fluid return to correspondingly extend and retract the piston; and
   a tilt saddle member that is supported by the upper end of the piston, the tilt saddle member having an upper surface that supports the load, wherein the tilt saddle member has a tilt saddle that wobbles relative to the piston in response to angular misalignments with the load; and
   a support member connected to the cylinder that can be raised relative to the cylinder to contact and support the tilt saddle member when the piston is extended.

2. The actuator as recited in claim 1, wherein the support member is a nut that is threadedly attached to the cylinder side wall such that rotation of the nut selectively raises and lowers the nut relative to the cylinder.

3. The actuator as recited in claim 1, wherein the cylinder is a double-acting cylinder comprising a second hydraulic chamber disposed between the piston head and the upper end of the cylinder.

4. The actuator as recited in claim 3, wherein the piston rod and cylinder upper end define a sealed interface.

5. The actuator as recited in claim 1, wherein the support member directly engages a lower surface of the tilt saddle.

6. The actuator as recited in claim 1, wherein the tilt saddle member includes a tilt saddle plate having a lower surface that is supported by the upper end of the piston rod, and an upper surface that supports the tilt saddle.

7. The actuator as recited in claim 6, wherein the support member engages the lower surface of the saddle plate.

8. The actuator as recited in claim 1, wherein the fluid is a hydraulic fluid.

9. A method of operating a linear actuator of the type having A) a cylinder and a piston having an upper end extending through the cylinder and operable to support a load and a lower end including a piston head, a tilt saddle member having a lower surface supported by the upper end of the piston and an upper surface configured to support the load, B) a chamber disposed between the cylinder and the piston head, wherein the chamber is in communication with a fluid source, and C) an axially translatable support member disposed outwardly of the cylinder, the steps comprising:
   (A) placing the upper end of the piston in axial alignment with a load that is to be supported;
   (B) introducing pressurized fluid into the chamber to extend the piston outwardly from the cylinder so as to move the load;
   (C) raising the tilt saddle member to as to engage the load; and
   (D) raising the support member to support the tilt saddle.

10. The method as recited in claim 9, wherein the support member is threadedly attached to the cylinder, and wherein the step (D) further comprises rotating the support member.

11. The method as recited in claim 9, further comprising, after step (D), relieving the pressure in the chamber.

12. The method as recited in claim 9, wherein the raising step further comprises directly supporting a tilt saddle of the tilt saddle member with the support member.

13. The method as recited in claim 9, wherein a tilt saddle of the tilt saddle member is supported by the upper end of the piston via a tilt saddle plate, and wherein step (D) further comprises engaging the tilt saddle plate with the support member.

14. The method as recited in claim 9, wherein the cylinder is a double-acting cylinder.

* * * * *